United States Patent [19]
Hanson et al.

[11] Patent Number: 5,486,698
[45] Date of Patent: Jan. 23, 1996

[54] THERMAL IMAGING SYSTEM WITH INTEGRATED THERMAL CHOPPER

[75] Inventors: Charles M. Hanson, Richardson; Dana Dudley; James E. Robinson, both of Dallas, all of Tex.

[73] Assignee: Texas Instruments Incorporated, Dallas, Tex.

[21] Appl. No.: 229,497

[22] Filed: Apr. 19, 1994

[51] Int. Cl.$^6$ .................................. G01J 5/10
[52] U.S. Cl. .................. 250/332; 250/338.3; 250/350; 250/351
[58] Field of Search ................ 250/338.3, 351, 250/350, 338.1, 332

[56] References Cited

U.S. PATENT DOCUMENTS

| | | | |
|---|---|---|---|
| 3,846,820 | 11/1974 | Lampe et al. | 357/31 |
| 4,018,608 | 4/1977 | Frazier | 96/27 |
| 4,080,532 | 3/1978 | Hopper | 250/332 |
| 4,142,207 | 2/1979 | McCormack et al. | 358/113 |
| 4,143,269 | 3/1979 | McCormack et al. | 250/352 |
| 4,162,402 | 7/1979 | Hopper | 250/332 |
| 4,205,227 | 5/1980 | Reed | 250/330 |
| 4,275,302 | 6/1981 | Imbert et al. | 250/330 |
| 4,379,232 | 5/1983 | Hopper | 250/332 |
| 4,594,507 | 6/1986 | Elliott et al. | 250/331 |
| 4,615,595 | 10/1986 | Hornbeck | 353/122 |
| 4,695,715 | 9/1987 | Malm | 250/211 J |
| 4,705,361 | 11/1987 | Frazier et al. | 350/355 |
| 4,710,732 | 12/1987 | Hornbeck | 332/7.51 |
| 4,751,387 | 6/1988 | Robillard | 250/331 |
| 4,956,619 | 9/1990 | Hornbeck | 330/4.3 |
| 4,982,093 | 1/1991 | Voles | 250/332 |
| 4,994,672 | 2/1991 | Cross et al. | 250/330 |
| 5,010,251 | 4/1991 | Grinberg et al. | 250/332 |
| 5,021,663 | 6/1991 | Hornbeck | 250/349 |
| 5,047,644 | 9/1991 | Meissner et al. | 250/332 |
| 5,051,591 | 9/1991 | Trotta et al. | 250/351 |
| 5,061,049 | 10/1991 | Hornbeck | 359/224 |
| 5,083,857 | 1/1992 | Hornbeck | 359/291 |
| 5,196,703 | 3/1993 | Keenan | 250/332 |
| 5,238,530 | 8/1993 | Douglas et al. | 156/635 |
| 5,264,326 | 11/1993 | Meissner et al. | 430/313 |
| 5,367,167 | 11/1994 | Keenan | 250/338.4 |

FOREIGN PATENT DOCUMENTS

| | | |
|---|---|---|
| 939943 | 1/1974 | Canada . |
| 2111746 | 9/1971 | Germany . |
| 2752704 | 6/1978 | Germany . |
| 2251952 | 7/1992 | United Kingdom . |
| WO9116607 | 10/1991 | WIPO . |

OTHER PUBLICATIONS

R. A. Wood, et al., "HIDAD—A Monolithic, Silicon, Uncooled Infrared Imaging Focal Plane Array," 16.5/Wood/HIDAD, pp. 579–581.

*Primary Examiner*—Constantine Hannaher
*Attorney, Agent, or Firm*—Brian A. Carlson; James C. Kesterson; Richard L. Donaldson

[57] ABSTRACT

A thermal imaging system (10) contains a focal plane array (14) including a plurality of thermal sensors (50) mounted on a substrate (52). The focal plane array (14) generates both a reference signal which represents the temperature of the substrate (52) and a biased signal corresponding to the total radiance emitted by a scene (11). Electronics (16) process the reference signal and the biased signal to obtain an unbiased signal representing radiance differences emitted by objects in the scene (11). A thermoelectric cooler/heater (38) may be provided to optimally adjust the temperature of the substrate (52) to improve overall image quality. Each thermal sensor (50) contains an electrode (66 and 68) that electrically couples the thermal sensor (50) to the substrate (52) and also allows the thermal sensor (50) to deflect, contact, and thermally shunt with the substrate (52).

22 Claims, 3 Drawing Sheets

THERMAL IMAGING SYSTEM WITH INTEGRATED THERMAL CHOPPER

TECHNICAL FIELD OF THE INVENTION

This invention relates generally to infrared or thermal imaging systems, and more particularly to a thermal imaging system having an integrated thermal chopper.

BACKGROUND OF THE INVENTION

Infrared or thermal imaging systems typically use a plurality of thermal sensors to detect infrared radiation and produce an image capable of being visualized by the human eye. Thermal imaging systems detect thermal radiance differences between objects in a scene and display these differences in thermal radiance as a visual image of the scene. Certain infrared radiation characteristics must be dealt with to obtain a satisfactory image. One such consideration is the background radiance from the scene which is frequently a large component of the total infrared radiation emitted by the scene. Radiance differences among the objects are often small as compared to the large value of background radiance.

The basic components of a thermal imaging system typically include optics for collecting and focusing infrared radiation from a scene, an infrared detector having a plurality of thermal sensors for converting the radiance to an electrical signal, and electronics for amplifying and processing the electrical signal into a visual display or for storage in an appropriate medium. Such thermal imaging systems use a variety of infrared detectors which are sometimes classified into two main categories as cooled and uncooled. Uncooled detectors include thermal sensors which generate a change in voltage due to a change in temperature resulting from incident infrared radiation striking the thermal sensor. Cooled detectors include thermal sensors which generate a change in voltage due to a photoelectron interaction within the material used to form the thermal sensor. This latter effect is sometimes called the internal photoelectric effect.

An infrared detector typically generates a signal in response to radiation emitted by a viewed scene. Either "staring" or scanning techniques may be used to produce the signal, but in either case, the signal has the same characteristics. The total signal detected by the infrared detector is a biased signal, which includes a direct current (DC) component or signal offset and an alternating current (AC) component or signal modulation. The signal offset represents the background radiation. The signal modulation represents radiance differences emitted by objects within the scene. Yet, because of the large background radiance, the amplitude of the signal modulation is small in comparison to the amplitude of the signal offset, making amplification and detection of the objects within the scene difficult.

Various efforts have been made to isolate the signal modulation from the biased signal. One approach is to establish a reference signal that is close in magnitude to the signal offset, and then to subtract the reference signal from the overall biased signal to obtain an unbiased signal that preferably contains only the signal modulation. One implementation of this approach is to include an optical device that artificially creates a referenced image. An example of one such thermal imaging system uses an image chopper to produce a de-focused image, which represents the background radiance. However, these mechanical image choppers are expensive and add significantly to the complexity of the infrared system.

SUMMARY OF THE INVENTION

In accordance with the present invention, the disadvantages and problems associated with previous thermal imaging systems have been substantially reduced or eliminated. The present invention provides an integrated thermal chopper that simply and inexpensively provides a reference signal which can be subtracted from the biased signal to produce an unbiased signal with minimum residual signal offset.

One aspect of the present invention includes a focal plane array having a plurality of thermal sensors which produce an image of a viewed scene. The plurality of thermal sensors produce a biased signal that represents the total radiance in the scene. The biased signal has both a signal offset representing the background radiation and a signal modulation representing the radiance differences associated with various objects in the scene. The thermal sensors produce a reference signal by thermally shunting with an underlying substrate. The reference signal is subtracted from the biased signal produced by the respective thermal sensor to produce an unbiased signal representing radiance differences which may be used to create a visual image of the scene.

Another aspect of the present invention includes integrating the functions of a thermal chopper with each thermal sensor. A focal plane array including a plurality of thermal sensors provides a signal output representative of the amount of thermal radiation incident to the focal plane array. Each thermal sensor comprises a plate electrically coupled to one side of a pair of thermally sensitive pixel elements. Each pixel element is coupled on the other side to a corresponding electrode. Each electrode, one for each pixel element, is coupled to a corresponding contact pad disposed on the substrate. A sensor signal path is formed between the contact pads through the common plate, the pixel elements, and the electrodes. Each electrode includes a flexible lead that allows the thermal sensor to deflect and contact the substrate for providing a reference signal representative of the temperature of the substrate.

Another aspect of the present invention is a method for producing an image of a scene using a thermal imaging system including a plurality of thermal sensors mounted on a substrate. The thermal sensors are thermally shunted to the substrate to establish a reference signal representative of the temperature of the substrate. Thermal radiation from the scene is then detected to form a biased signal representing the total radiance of the scene. The reference signal is subtracted from the biased signal to obtain an unbiased signal representing radiance differences emitted by objects in the scene. The method concludes by displaying an image in response to the unbiased signal.

One advantage of the present invention is that the thermal sensors are referenced thermally instead of electrically. A reference signal may be established by deflecting the thermal sensor so that it contacts the associated substrate and assumes the ambient temperature of the substrate. The reference signal is generated at the same point and in the same manner as the biased signal, that is, generated thermally at the detection region of the thermal sensor. Other approaches that electrically reference a thermal sensor require applying imprecise gains that attempt to describe the complicated thermal and electrical characteristics of the thermal sensor. By generating the reference signal and the biased signal at the same point and in the same manner, the present invention avoids apparent offset non-uniformities that exist in electrically-referenced thermal imaging systems.

Another advantage of the present invention is the controllability of the reference signal input to the thermal sensor. It is desirable to provide a reference signal that is close in magnitude to the signal offset representing the background radiance in the scene. In one embodiment of the present invention, a thermoelectric cooler/heater is provided that can regulate the temperature of the associated substrate. A feedback control loop processes the signal output and generates control signals for the thermoelectric cooler/heater to minimize the difference between the substrate reference signal and the signal offset. This temperature control system can actively monitor changes in background radiance and adjust the substrate temperature accordingly, resulting in fewer nonuniformities and an overall improvement in the quality of the displayed image.

Another advantage of the present invention is that the thermal chopper is integral to the focal plane array. Each individual thermal sensor can be deflected and thermally shunted on the underlying substrate. Therefore, by using current deformable micromirror device (DMD) fabrication techniques, a focal plane array is provided with a built-in thermal chopper that substantially reduces mechanical and optical problems encountered with previous choppers and thermal imaging systems. In addition, by providing an integrated thermal chopper, the present invention eliminates the high dynamic gain requirements, high power consumption, and electronic complexity of comparable unchopped systems.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiments of the present invention and its advantages are best understood by referring to FIGS. 1 through 7 of the drawings, like numerals being used for like and corresponding parts of the various drawings.

Figure 1:
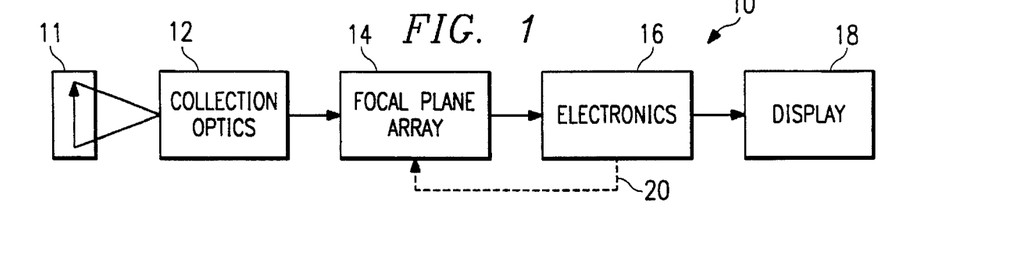
FIG. 1 is a block diagram of the components of a thermal imaging system constructed in accordance with the present invention.

FIG. 1 is a block diagram of thermal imaging system 10 constructed in accordance with the present invention. An example of another thermal imaging system is shown in U.S. Pat. No. 4,143,269 issued to McCormack et al. and entitled "Ferroelectric Imaging System." An example of a thermal imaging system that uses an image chopper is shown in U.S. Pat. No. 5,051,591 issued to Trotta, et al. and entitled "Reflective Chopper for Infrared Imaging Systems." Both of these patents are assigned to Texas Instruments Incorporated, the assignee of this invention.

During operation of thermal imaging system 10, infrared radiation from scene 11 is received by collection optics 12 and focused on focal plane array 14. Signals from focal plane array 14 are delivered to electronics 16 where they are processed and passed to display 18. At predetermined intervals, electronics 16 direct focal plane array 14 to generate a reference signal, as shown functionally by dashed line 20. In accordance with the present invention, the reference signal for focal plane array 14 is generated by thermally shunting each thermal sensor to an underlying substrate. The process of establishing a reference signal for focal plane array 14 will be described in more detail with reference to FIGS. 4 through 7.

Scene 11 may be any scene of objects that emit thermal radiation. As with all thermal imaging systems, the invention is especially useful when imaging by means of visual wavelengths is unavailable, such as in the dark or when vision is impaired by smoke, dust, or other particles. The invention is, of course, also useful during the day and when vision by means of the visual wavelengths is available. As will be explained later in more detail, a thermal sensor incorporating the present invention may also be used with a radiometer.

Optics 12 are well known in the art of thermal imaging, and may be any one of a number of systems of lenses. Optics 12 produce a focused image on focal plane array 14, so that focal plane array 14 may detect the radiance of the focused radiation it receives. The lenses are made of material that transmits infrared radiation, such as germanium. The placement of optics with respect to focal plane array 14 is accomplished using well known principles of optical design as applied to thermal imaging systems.

Focal plane array 14 may be any one of a wide variety of detectors. The invention may be used with either "staring" or "scanning" detectors. A staring detector is a large area detector onto which the entire image is focused at once and read out electronically. A scanning detector uses a mirror or other means to sweep the signal across the detector one element at a time. Usually, although not necessary for the invention, both types of detectors consist of a plurality of thermal sensors, with the output of each thermal sensor representing a portion of the viewed scene. For example, when a standard cathode ray tube (CRT) display is used, the output of each thermal sensor may represent a single pixel of the total image. Thermal sensor 50 incorporating the present invention may be particularly beneficial for use in high density arrays and with high density visual displays.

Electronics 16 perform certain operations on the signals received from focal plane array 14. Some of the functions of electronics 16, such as receiving signals from focal plane array 14 and amplifying a signal representing intensity changes, are well known in the art of thermal imaging. Electronics 16 may include the necessary processing and components for a substrate temperature control circuit 28 that drives a thermoelectric cooler/heater 38, as described in detail with reference to FIG. 2. Electronics 16 may also incorporate a thermal sensor deflection control circuit for referencing or thermally chopping the plurality of thermal sensors in focal plane array 14, as explained below with reference to FIGS. 4 through 7.

Display 18 may be a special viewing device, such as a CRT. For some applications, display 18 may function as a radiometer and provide a measurement of the radiant energy incident on focal plane array 14. Depending on the type of display, an additional function of electronics 16 may be to transform the signals from focal plane array 14 into a format for use with display 18. The image on display 18 is typically a visual representation of the radiance image on focal plane array 14 emitted by scene 11.

Although not shown in FIG. 1, thermal imaging system 10 could be easily modified to permit digitization of the image signals so that the signals could be stored and processed as digital data. This requires sampling, storage, and processing devices, which are all well known in the field of video and graphics processing. Alternatively, thermal imaging system 10 may function as a radiometer to provide temperature measurements of radiant energy sources present in scene 11.

In operation, electronics 16 direct focal plane array 14 to establish a reference signal in accordance with the teachings of the present invention, as described below. Upon establishing such reference signal, focal plane array 14 then detects the total radiance from scene 11 as focused on its plurality of thermal sensors 50 by collection optics 12. Focal plane array 14 generates a biased signal containing both a signal offset representing the background radiance and a signal modulation representing the radiance differences emitted by objects in scene 11. Electronics 16 then process the biased signal and reference signal from focal plane array 14 to generate an unbiased signal, which is transformed into video data for display 18 or stored in a memory (not shown) for later processing. The process of establishing a reference signal and receiving a biased signal is repeated in succession for additional frames of video data to be sent to display 18. It should be understood that the present invention contemplates establishing a reference signal before or after detection of a biased signal, or establishing a reference signal before or after a predetermined number of biased signals have been received and processed.

Figure 2:
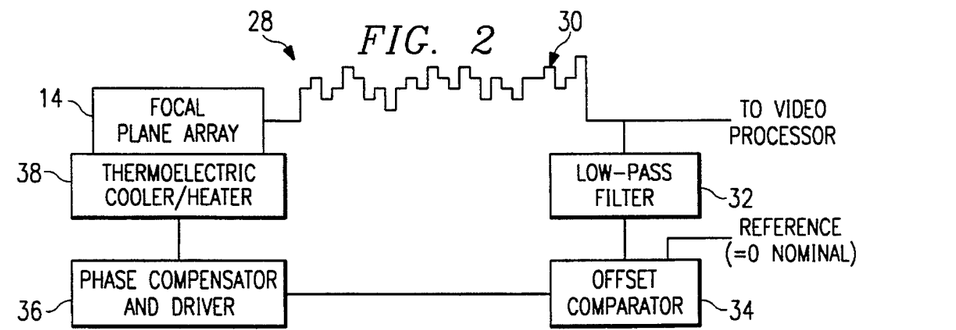
FIG. 2 is a block diagram of the temperature control circuit associated with the thermal imaging system of FIG. 1.

FIG. 2 is a block diagram of optional temperature control circuit 28 associated with thermal imaging system 10 of FIG. 1. In addition to directing focal plane array 14 to establish a reference signal, dashed line 20 from electronics 16 also represents operation of temperature control circuit 28 that adjusts the temperature of substrate 52 associated with focal plane array 14. The reference signal established by thermally shunting the plurality of thermal sensors 50 in focal plane array 14 can be controlled to reduce the signal offset of the biased signal received by electronics 16 from focal plane array 14.

Focal plane array 14 generates biased signal 30 which includes an alternating current (AC) component and a direct current (DC) component. The AC component of biased signal 30 is the signal modulation representing radiance differences emitted by objects in scene 11, and the DC component is a bias or signal offset representing the background radiance of scene 11. Biased signal 30 is passed to a video processor (not shown) in electronics 16, and also passed in a feedback loop to low pass filter 32 to isolate the DC component. The isolated DC component or signal offset is then received by offset comparator 34 and compared to a reference offset. Nominally, the reference offset used by offset comparator 34 would be zero volts.

The output of offset comparator 34 is a control signal representing the difference between the signal offset and the reference offset. The control signal is received at phase compensator and driver 36 which amplifies the control signal and drives thermoelectric cooler/heater 38 to adjust the temperature of substrate 52 of focal plane array 14.

Temperature control circuit 28 of FIG. 2 operates to minimize or remove the signal offset of the biased signal generated by focal plane array 14. By removing most or all of the DC component of biased signal 30, temperature control circuit 28 provides a cleaner signal to electronics 16 with a minimum amount of offset non-uniformity and undesirable spatial differentiation. It should be understood that the reference offset used by offset comparator 34 may be zero volts, but may also be any other voltage suitable for the particular implementation of the present invention.

Temperature control circuit 28 operates during the generation of biased signal 30. Therefore, when focal plane array 14 establishes a reference signal by thermally shunting or chopping its thermal sensors, the signal produced is characteristically a straight line with no AC component.

Figure 3:
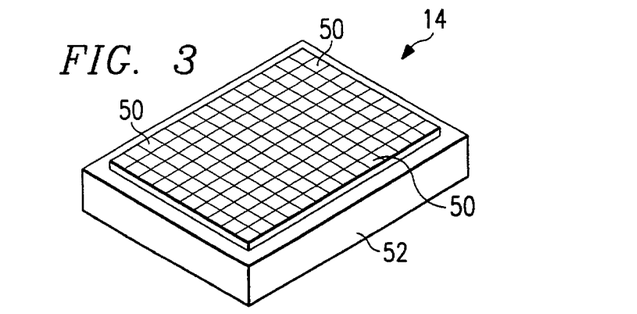
FIG. 3 is a schematic representation in elevation with portions broken away of a focal plane array with a plurality of thermal sensors constructed in accordance with the present invention.

FIG. 3 shows focal plane array 14 comprising a plurality of thermal sensors 50 arranged in a matrix and overlying substrate 52. The quantity and location of thermal sensors 50 will depend upon the desired N by M configuration for focal plane array 14. In one embodiment, each thermal sensor 50 provides a pixel of video data to display 18. Substrate 52 may be an integrated circuit substrate that provides the necessary electrical couplings and circuitry to control the deflection of thermal sensors 50 and process the signals generated by focal plane array 14. U.S. Pat. No. 4,143,269, referenced above, and U.S. Pat. No. 5,047,644 issued to Meissner, et al. and entitled "Polyimide Thermal Isolation Mesa for a Thermal Imaging System" both disclose thermal sensors mounted on an underlying integrated circuit substrate.

Focal plane array 14 having a plurality of thermal sensors 50 incorporating the present invention may be particularly beneficial for use with a wide variety of displays including high definition visual displays. Each row of thermal sensors 50 in focal plane array may be chopped in sequence and displayed in sequence on the associated display 18. Since the chopping function associated with focal plane array 14 is performed as an integral part of each thermal sensor 50, alternate rows of thermal sensors 50 may be chopped to provide the desired signal for such standard television displays which typically have 480 rows of pixels. The present invention allows varying the chopping sequence as desired for each type of display 18 used with thermal imaging system 10.

Since the chopping function is performed as an integral part of each thermal sensor 50, focal plane array 14 may be chopped by each row of thermal sensors 50 or chopped by each column of thermal sensors 50. The rows and columns may be chopped sequentially or with any desired alternating pattern. Each thermal sensor 50 may be matched with a pixel in the associated display 18 and the thermal sensors 50 read out in any sequence as desired for the specific display 18. The ability to selectively read out each thermal sensor 50 may be particularly beneficial when the signal from focal plane array 14 is coupled with a light emitting diode display.

Figure 4:
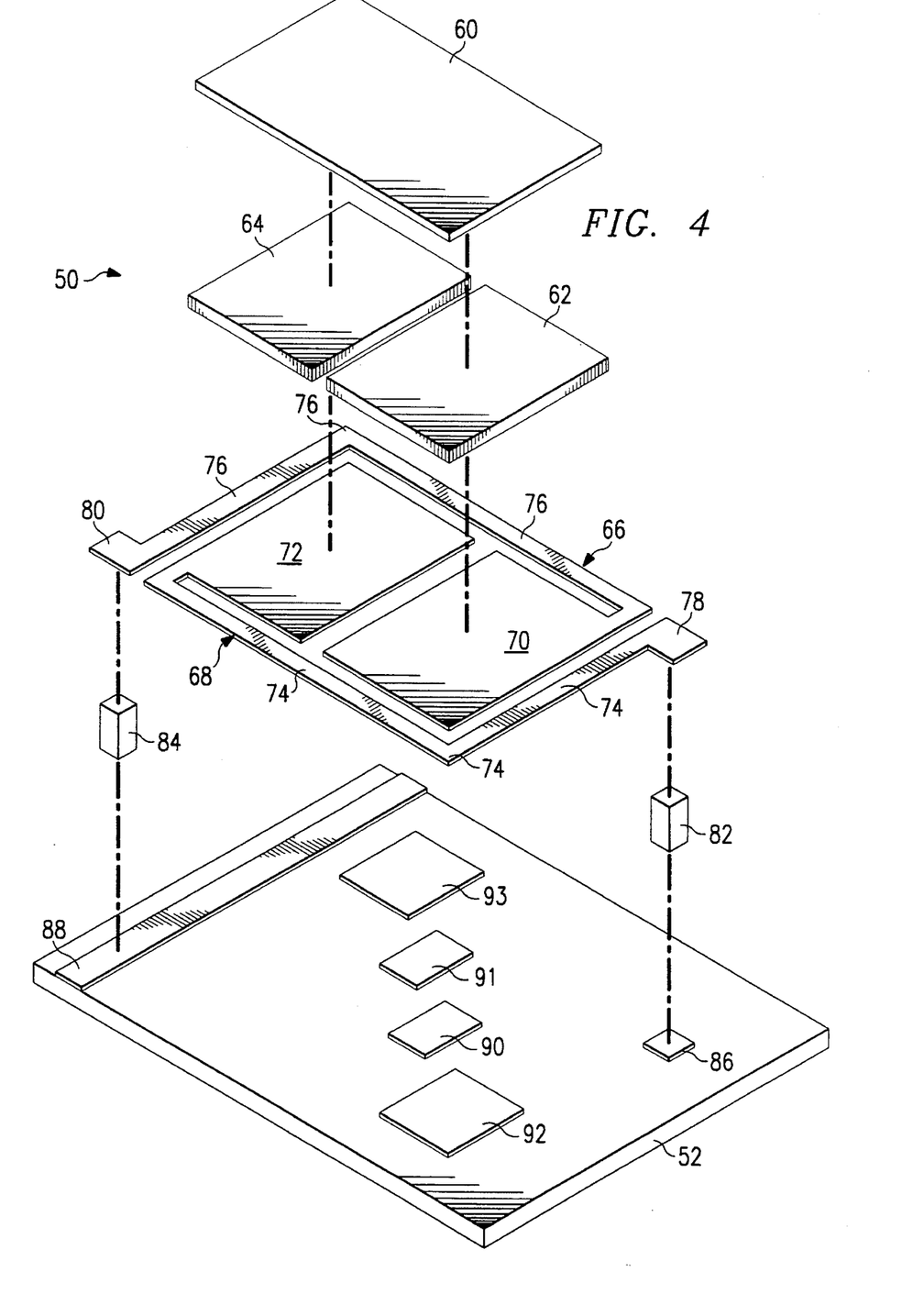
FIG. 4 is an exploded schematic representation of a thermal sensor mounted on a substrate in accordance with one embodiment of the present invention.

FIG. 4 shows an exploded schematic representation of thermal sensor 50 mounted on substrate 52 in accordance with the teachings of the present invention. Thermal sensor 50 includes common plate 60 formed from platinum, conductive oxides, or any other appropriate materials. In one embodiment of the invention, common plate 60 is preferably transparent to incident infrared radiation. Electrically coupled to and directly underlying common plate 60 are a pair of pixel elements 62 and 64 formed from any materials that are sensitive to thermal energy. Appropriate materials include, but are not limited to: pyroelectric material such as barium strontium titanate (BST), any materials in the lead titanate family including lead titanate (PT), lead lanthanum titanate (PLT), lead zirconium titanate (PZT), and lead lanthanum zirconium titanate (PZLT). It should be understood that the present invention contemplates formation of pixel elements 62 and 64 from any bolometric material such as amorphous silicon and vanadium oxide (VO), thermocouples, or other temperature sensitive materials and devices that provide a satisfactory signal in response to changing temperature.

Pixel elements 62 and 64 are coupled on one side to common plate 60 and on the other side to a pair of electrodes 66 and 68, respectively. Pixel element 62 and corresponding electrode 66 are electrically isolated from pixel element 64 and corresponding electrode 68, except for common plate 60, which provides a signal path between pixel elements 62 and 64.

Electrodes 66 and 68 are designed to provide electrical coupling between pixel elements 62 and 64 and substrate 52 while providing flexibility to thermal sensor 50 to allow deflection and thermal shunting with substrate 52. Electrodes 66 and 68 each comprise corresponding mounting areas 70 and 72, flexible arms or leads 74 and 76, and contact areas 78 and 80. Mounting areas 70 and 72 provide electrical coupling between electrodes 66 and 68 and pixel elements 62 and 64, respectively. Flexible leads 74 and 76 allow thermal sensor 50 to alternately deflect and contact substrate 52. Contact areas 78 and 80 provide electrical coupling between thermal sensor 50 and substrate 52. The dimensions (length, width and thickness) of flexible leads 74 and 76 and the materials used to form flexible leads 74 and 76 are preferably selected to provide thermal isolation between thermal sensor 50 and substrate 52.

Thermal sensor 50, comprising common plate 60, pixel elements 62 and 64, and electrodes 66 and 68 is mounted to substrate 52 using posts 82 and 84 that provide a spatial separation between the bottom of electrodes 66 and 68 and the top surface of substrate 52. Posts 82 and 84 cooperate with respective contact areas 78 and 80 of electrodes 66 and 68 to provide electrical coupling between thermal sensor 50 and substrate 52 to establish the desired signal flowpath. Posts 82 and 84 also provide the desired mechanical support required to position thermal sensor 50 relative to substrate 52. The spacing between thermal sensor 50 and substrate 52 may be optimized for the wavelength of infrared radiation detected by thermal sensor 50. In one embodiment, the height of posts 82 and 84 is preferably one quarter of the wavelength of the incident radiation.

Post 82 couples electrode 68 to signal contact pad 86. Post 84 couples electrode 66 to bias voltage contact pad 88. As shown in FIG. 4, bias voltage contact pad 88 may be a continuous bus delivering a common bias voltage to a plurality of thermal sensors 50.

Also disposed on substrate 52 are components necessary to effectuate the deflection and resulting thermal shunt of thermal sensor 50 with substrate 52. Address electrodes 90 and 91 are supplied with a voltage that causes thermal sensor 50 to deflect and contact landing pads 92 or 93 on substrate 52. Upon contacting landing pads 92 or 93, thermal sensor 50 is thermally shunt by assuming the ambient temperature of substrate 52. In an alternative configuration, a single address electrode and a single landing pad may be incorporated into the present invention to effect deflection and reset operations of thermal sensor 50. Electromechanical operation of a digital micromirror device (DMD) used in video display systems is described in U.S. Pat. No. 5,061,049 to Hornbeck and assigned to Texas Instruments Incorporated, the assignee of this invention. U.S. Pat. No. 5,021,663 to Hornbeck and assigned to Texas Instruments Incorporated, the assignee of this invention, shows a bolometer with bifurcated leads.

Thermal sensor deflection control circuitry (not shown) supplies control voltages to address electrodes 90 and 91 to provide selective or controlled deflection of thermal sensor 50. The deflection control circuitry may be integral to substrate 52, but portions of this circuitry may be separate from substrate 52.

It should be understood that the present invention contemplates alternate configurations of electrodes 66 and 68. The overall design criteria of electrodes 66 and 68 is that they electrically couple thermal sensor 50 to substrate 52 while providing sufficient flexibility to allow thermal sensor 50 to deflect and thermally shunt with landing pads 92 and 93 disposed on substrate 52. The present invention also contemplates use of a common bias voltage bus 88, as shown in FIG. 4, or a separate contact pad for electrodes 66 and 68 for each thermal sensor 50 in focal plane array 14. The arrangement and construction of contact pads 86 and 88 on substrate 52 will depend upon the specific operation of focal plane array 14, for example, the specific processing and electrical coupling requirements of an underlying integrated circuit substrate.

Figure 5:
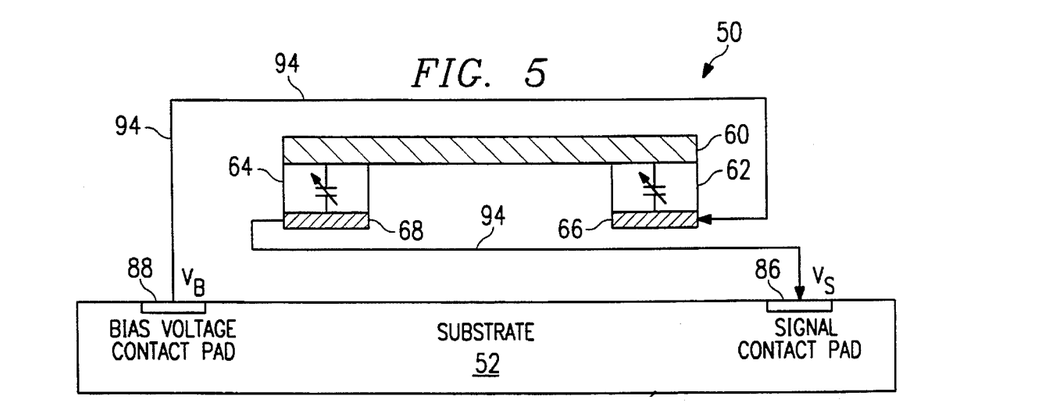
FIG. 5 is a schematic representation of the signal flow path associated with the thermal sensor of FIG. 4.

FIG. 5 is a schematic representation of the signal flow path 94 within thermal sensor 50 mounted to substrate 52. The principal components of signal flow path 94 include a pair of contact pads 86 and 88 on substrate 52 and pixel elements 62 and 64 with their respective electrodes 66 and 68 and common plate 60 extending across both pixel elements 62 and 64.

Substrate 52 supplies bias voltage ($V_B$) to bias voltage contact pad 88 electrically coupled to electrode 66. Incident infrared radiation will cause a temperature change in pixel elements 62 and 64 resulting in a change in capacitance and polarization between common plate 60 and electrodes 66 and 68, respectively. A signal representative of the incident infrared radiation will flow from pixel element 62 through common plate 60 to pixel element 64. From pixel element 64 the signal will flow from electrode 68 to signal contact pad 86 on substrate 52.

The signal ($V_S$) is a function of the change in capacitance and polarization of pixel elements 62 and 64 resulting from the incident infrared radiation. Therefore, pixel elements 62 and 64 may be represented in signal flow path 94 as a pair of variable capacitors connected by common plate 60.

Figure 6:
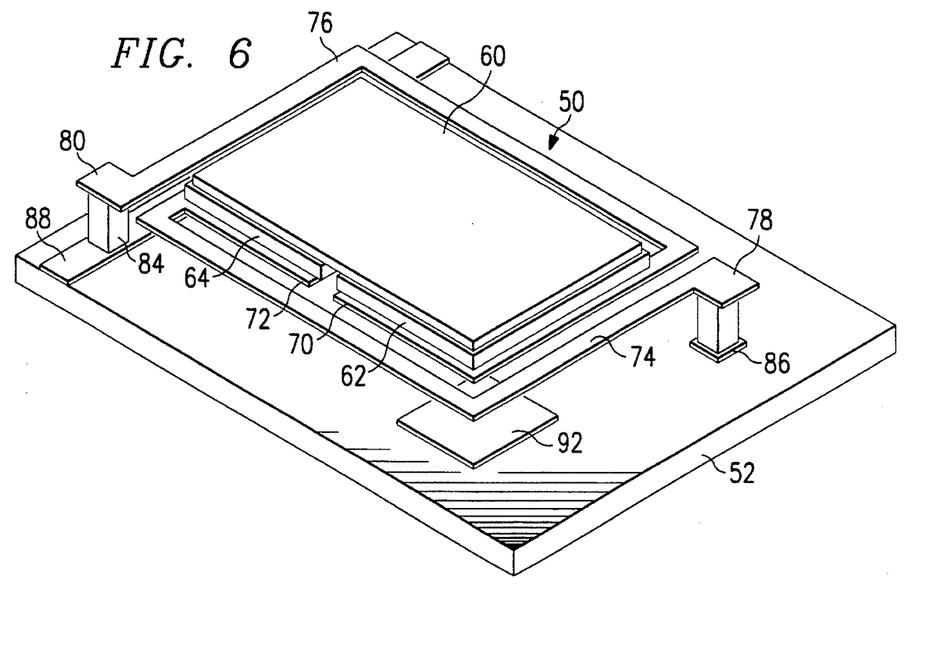
FIG. 6 is a schematic representation in oblique view showing the thermal sensor of FIG. 4 during the detection phase.
Figure 7:
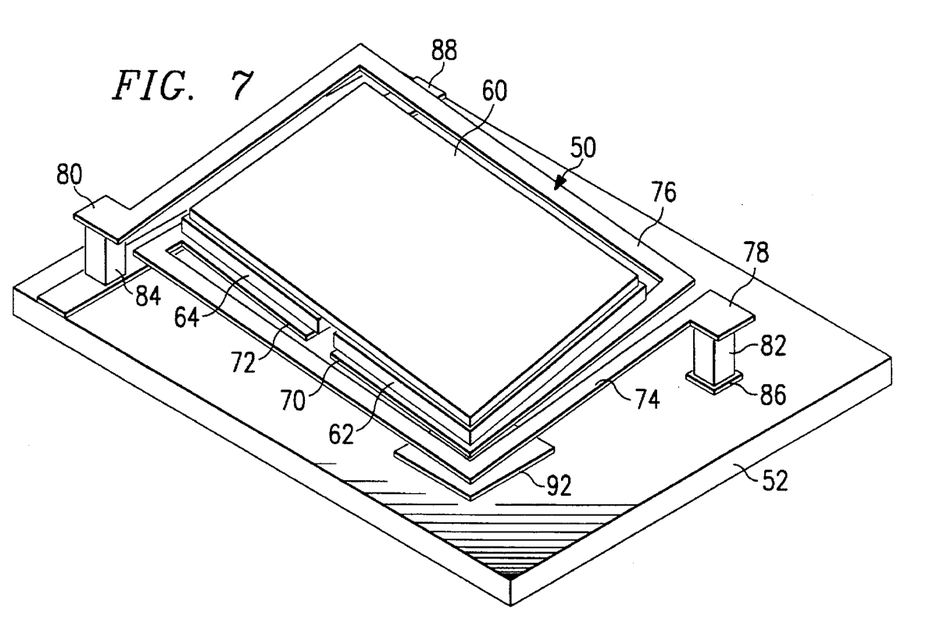
FIG. 7 is a schematic representation in oblique view showing the thermal sensor of FIG. 4 during the reference phase.

FIGS. 6 and 7 illustrate the operation of thermal sensor 50 during the detection phase (FIG. 6) and reference phase (FIG. 7) of operation. In FIG. 6, thermal sensor 50 mounted on substrate 52 is shown in an undeflected or detecting position. In such a position, bias voltage contact pad 88 supplies a bias voltage ($V_B$) to thermal sensor 50, and signal contact pad 86 receives a biased signal representing the total amount of thermal radiation incident to thermal sensor 50. The value of $V_B$ may be selected as appropriate for the material used to form pixel elements 62 and 64 and the desired operating characteristics of thermal sensor 50. During the detection phase shown in FIG. 6, the temperature of substrate 52 may be adjusted in response to the signal generated by thermal sensor 50. The operation of temperature control circuit 28 to adjust the substrate temperature, and in turn the reference signal, is described in detail with reference to FIG. 2.

FIG. 7 depicts thermal sensor 50 during the reference phase, where thermal sensor 50 deflects and contacts landing pad 92 to accomplish a thermal shunt. Upon contacting landing pad 92, thermal sensor 50 assumes the ambient temperature of substrate 52. By thermally shunting or chopping all thermal sensors 50 in focal plane array 14, the present invention establishes a reference signal thermally, as opposed to electrically. This is a distinct advantage of the present invention, since both the biased signal and the reference signal are generated by thermal sensor 50 in the same manner.

An electrically-referenced system attempts to compensate for a signal offset by modifying the biased signal generated by thermal sensor 50. Current systems do this by estimating the thermal and electrical characteristics along signal flow path 94, as shown in FIG. 5. The interplay between the components and the associated signal flow path is very complex, and often leads to applying different net gains to the reference signal and the biased signal. This may result in apparent offset non-uniformity or undesirable spatial differentiation of the final displayed image.

Thermal sensor 50 offers another advantage over current thermal imaging systems since the thermal chopper is integrated into focal plane array 14. By using fabrication techniques commonly practiced in DMD applications, the present invention features a built-in thermal chopper that reduces mechanical problems associated with current thermal imaging systems using separate mechanical choppers.

During operation of thermal sensor 50, one or more address electrodes 90 and 91 may be supplied with a deflection control signal. In one embodiment, the deflection control signal supplied to address electrodes 90 and 91 is preferably a symmetric waveform that produces detection and reference phases of approximately equal time duration. For example, a deflection control signal delivered to address electrodes 90 and 91 may be unasserted for 1/60th of a second, representing the detection phase of thermal sensor 50 as shown in FIG. 6. For the next 1/60th of a second, the deflection control signal is asserted to place thermal sensor 50 in a deflected state or reference phase as shown in FIG. 7. This operation would provide thirty frames of video data each second to be sent to display 18. It should be understood that the present invention contemplates any suitable deflection control circuitry for regulating the relative detection and reference phases of thermal sensor 50. In addition, one detection phase of thermal sensor 50 may provide one or more frames of video data to display 18 before transitioning to the reference phase.

For another aspect of the present invention, a deflection control signal may be supplied to address electrodes 90 and 91 to produce asymmetric detection and reference phases for the associated thermal sensor 50. When mounting area 70 touches landing pad 92, the temperature of thermal sensor 50 will quickly equalize with substrate 52. Therefore, thermal sensor 50 may be quickly returned to the detection phase as shown in FIG. 6 to increase the sample time for looking at scene 11 with thermal sensors 50. The present invention allows varying the duty cycle between the detection phase and the reference phase to optimize the performance of thermal sensors 50.

Although the present invention and its advantages have been described in detail, it should be understood that various changes, substitutions and alterations can be made therein without departing from the spirit and scope of the invention as defined by the appended claims.

What is claimed is:

1. A thermal sensor mounted on a substrate to provide a signal representative of the amount of thermal radiation incident to the thermal sensor, comprising:

thermal sensitive material for generating a biased signal representing total radiance from the scene and for generating a reference signal by shunting the thermal sensitive material with the substrate;

at least one flexible arm for allowing selective deflection of the thermal sensitive material to contact the substrate and form the reference signal; and a signal flow path from the thermal sensitive material to a respective contact pad disposed on the substrate; and the signal flow path providing a reference signal representative of the temperature of the substrate when the thermal sensitive material deflects to contact the substrate.

2. The thermal sensor of claim 1, wherein the thermal sensitive material and the signal flow path further comprise:

a common plate;

a pair of thermally sensitive pixel elements, each pixel element electrically coupled on one side with the common plate and on the other side with a respective electrode;

a bias electrode for coupling one pixel element to a bias contact pad disposed on the substrate and for supplying a bias voltage to the thermal sensor; and a signal electrode for coupling the other pixel element to a signal contact pad disposed on the substrate and for receiving the signal from the thermal sensor.

3. The thermal sensor of claim 1, further comprising:

at least one address electrode disposed on the substrate for use in selectively deflecting the thermal sensor; and at least one landing pad disposed on the substrate for contacting a portion of the deflected thermal sensor, thereby providing thermal coupling between the thermal sensor and the substrate.

4. The thermal sensor of claim 1, further comprising a portion of a radiometer for measuring radiant energy from a selected source.

5. A thermal imaging system for producing an image of a scene, comprising:

optics for focusing radiation emitted by the scene on a focal plane array;

the focal plane array, including a plurality of thermal sensors mounted on a substrate, for generating a biased signal representing the total radiance from the scene and for generating a reference signal by thermally shunting the thermal sensors to the substrate;

electronics for receiving the biased signal and the reference signal and for subtracting the reference signal from the biased signal to obtain an unbiased signal representing radiance differences emitted by objects in the scene; and a display for receiving the unbiased signal and for displaying an image generated in response to the unbiased signal.

6. The system of claim 5, wherein each of the thermal sensors further comprises a pair of electrodes mounted on the substrate with flexible leads which allow selective deflection of the respective thermal sensor to contact the substrate and form the reference signal.

7. The system of claim 5, wherein the plurality of thermal sensors receive a bias voltage from the substrate and provide a signal to the substrate representative of the amount of thermal radiation incident to the focal plane array.

8. The system of claim 5, wherein the plurality of thermal sensors provide a signal representative of the amount of thermal radiation incident to the focal plane array, each thermal sensor comprising:

a common plate;

a pair of thermally sensitive pixel elements, each pixel element electrically coupled on one side with the common plate and on the other side with a respective electrode;

each electrode coupled to a respective contact pad disposed on the substrate, thereby forming a signal path between the contact pads through the common plate, the pixel elements, and the electrodes; and each electrode comprising a flexible lead that allows the thermal sensor to deflect and contact the substrate for providing the reference signal representative of the temperature of the substrate.

9. The system of claim 5, further comprising:

a low pass filter for receiving the biased signal and for extracting the DC component of the biased signal representing a signal offset;

a comparator for receiving the signal offset and for comparing the signal offset to a reference offset to obtain a control signal;

an amplifier for receiving the control signal and producing a drive signal; and a thermoelectric cooler/heater for responding to the drive signal by adjusting the temperature of the substrate, thereby reducing the difference between the signal offset and the reference offset.

10. A focal plane array including a plurality of thermal sensors mounted on a substrate to provide a signal representative of the amount of thermal radiation incident to the focal plane array, each thermal sensor comprising:

a common plate;

a pair of thermally sensitive pixel elements with each pixel element electrically coupled on one side with the common plate and on the other side with a respective electrode;

each electrode coupled to a respective contact pad disposed on the substrate for forming a signal path between the contact pads through the common plate, the pixel elements, and the electrodes; and each electrode comprising a flexible lead that allows the thermal sensor to deflect and contact the substrate for providing a reference signal representative of the temperature of the substrate.

11. The focal plane array of claim 10, wherein the electrodes for each thermal sensor comprise:

a bias electrode for coupling one pixel element to a bias contact pad disposed on the substrate and for supplying a bias voltage to the thermal sensor; and a signal electrode for coupling the other pixel element to a signal contact pad disposed on the substrate and for receiving the signal from the thermal sensor.

12. The focal plane array of claim 10, wherein each thermal sensor comprises:

at least one address electrode disposed on the substrate that when activated causes the thermal sensor to selectively deflect; and at least one landing pad disposed on the substrate for contacting a portion of the deflected thermal sensor, thereby providing thermal coupling between the thermal sensor and the substrate.

13. The focal plane array of claim 10, wherein the pixel elements are formed from a pyroelectric material.

14. The focal plane array of claim 10, wherein a temperature control circuit adjusts the temperature of the substrate.

15. The focal plane array of claim 10, wherein a temperature control circuit adjusts the temperature of the substrate, the temperature control circuit further comprising:

a low pass filter for receiving the signal and for extracting the DC component of the signal representing a signal offset;

a comparator for receiving the signal offset and for comparing the signal offset to a reference offset to obtain a control signal;

an amplifier for receiving the control signal and producing a drive signal; and a thermoelectric cooler/heater for responding to the drive signal by adjusting the temperature of the substrate, thereby reducing the difference between the signal offset and the reference offset.

16. A method for producing an image of a scene using a thermal imaging system with a plurality of thermal sensors mounted on a substrate, comprising the steps of:

thermally shunting the thermal sensors to the substrate to establish a reference signal representative of the temperature of the substrate;

detecting the thermal radiation from the scene to form a biased signal representing the total radiance of the scene;

subtracting the reference signal from the biased signal to obtain an unbiased signal representing radiance differences emitted by objects in the scene; and displaying an image in response to the unbiased signal.

17. The method of claim 16, wherein the steps of thermally shunting and detecting are each executed in approximately equal time.

18. The method of claim 16, wherein the steps of thermally shunting and detecting are executed with the detecting time period substantially longer than the shunting time period.

19. The method of claim 16, wherein the step of thermally shunting comprises:

activating at least one address electrode disposed on the substrate for each thermal sensor; and deflecting each thermal sensor in response to the corresponding activated address electrode until a portion of the thermal sensor contacts at least one landing pad disposed on the substrate.

20. The method of claim 16, wherein the step of detecting further comprises:

deactivating at least one address electrode disposed on the substrate for each thermal sensor; and returning each thermal sensor to an undeflected state for detecting the thermal radiation from the scene.

21. The method of claim 16, further comprising controlling the temperature of the substrate during the step of detecting, comprising the steps of:

extracting the DC component of the biased signal representing a signal offset;

comparing the signal offset to a reference offset to obtain a control signal; and driving a thermoelectric cooler/heater in response to the control signal to adjust the temperature of the substrate, thereby reducing the difference between the signal offset and the reference offset.

22. The method of claim 16, further comprising controlling the temperature of the substrate to adjust the reference signal sensed by the thermal sensors.

* * * * *